March 19, 1946.  M. MILLER  2,396,717
CONNECTOR FOR TIMBERS OR THE LIKE
Filed Aug. 17, 1943

Max Miller
INVENTOR.

BY *Knowles*
ATTORNEYS.

Patented Mar. 19, 1946

2,396,717

UNITED STATES PATENT OFFICE 2,396,717

CONNECTOR FOR TIMBERS OR THE LIKE

Max Miller, Washington, D. C.

Application August 17, 1943, Serial No. 498,954

5 Claims. (Cl. 20—92)

This invention relates to a means for connecting elements of wood or wood and metal structures, and has for an object the provision of means whereby the insufficiencies of ordinary bolting as a means of joining timbers and/or timbers and metal elements, are overcome.

Heretofore dowels or keys have been used to transmit shearing forces developed on the contacting faces of connected members. These have been preformed discs or rings which have been embedded partially in the face of each of two adjoining timbers, and a clamping bolt has been extended through the centers of these keys or dowels and entirely through the connected timbers or the like for the purpose of keeping the timbers from spreading because of the tendency of the connectors to tilt or overturn when subjected to the forces exerted through the timbers.

Connectors of the types described have certain disadvantages which the present invention is designed to overcome. For example, the solid disk type of connector uses considerable weight of metal which, under present conditions, should be avoided. The ring type of connector uses less metal but does not properly resist overturning because its edges naturally cut or press into the wood as the ring connector begins to overturn or tilt under application of the load. In this connection attention is directed to pages 7, 8, 9, 112-113 of a publication of the U. S. Department of Commerce entitled "Modern Connectors for Timber Construction," 1933. A ring connector cannot possibly come into direct contact with the clamping bolt for support thereby overturning; and both the disc and ring types have disadvantages arising from the fact that the metal connector must fit the groove or sinkage provided therefor with only very small clearance tolerance. Consequently the locations of the numerous grooves and/or recesses in many members meeting at a joint and often having different angular relationships, must be determined accurately to permit proper assembly of the timbers and their keying connectors. Thus they call for considerable drafting labor to attain exact dimensioning of the connector positions; and a corresponding expenditure of skilled mechanical labor for forming the grooves and/or recesses in the correct positions. It has been found, furthermore, that the most careful workmanship often is vitiated considerably by the natural swelling and/or shrinkage of the individual timbers during the time interval between the grooving operations and the operation of assembling the structure. The need for exact forming of recesses or grooves and the difficulties experienced in fitting the parts during the final assembly, limit the connectors to the circular form and prevent the use of other shapes of connectors which might be more advantageous for structural reasons.

The present invention has for its object the provision of a means and also a method whereby the disadvantages heretofore pointed out are overcome and it becomes possible quickly and without the use of skilled mechanics, to provide strong connectors between timbers or timbers and metal elements whereby the parts can be held properly assembled following any desired relative angular adjustment, the assembly being maintained without danger of shearing, spreading or other undesirable developments which heretofore have been encountered.

With the foregoing and other objects in view which will appear as the description proceeds, the invention resides in certain features of construction and combinations of parts and in certain steps of the method hereinafter more fully described and pointed out in the claims, it being understood that various changes may be made within the scope of the invention without departing from the claims appended hereto.

In the accompanying drawing the preferred form of the invention has been shown.

Figure 1:
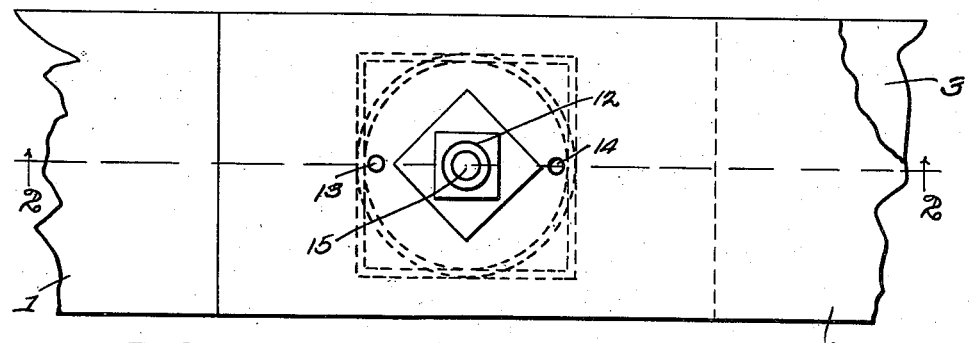
Figure 1 is an elevation of lapping end portions of some timbers provided with my improved connector.
Figure 2:
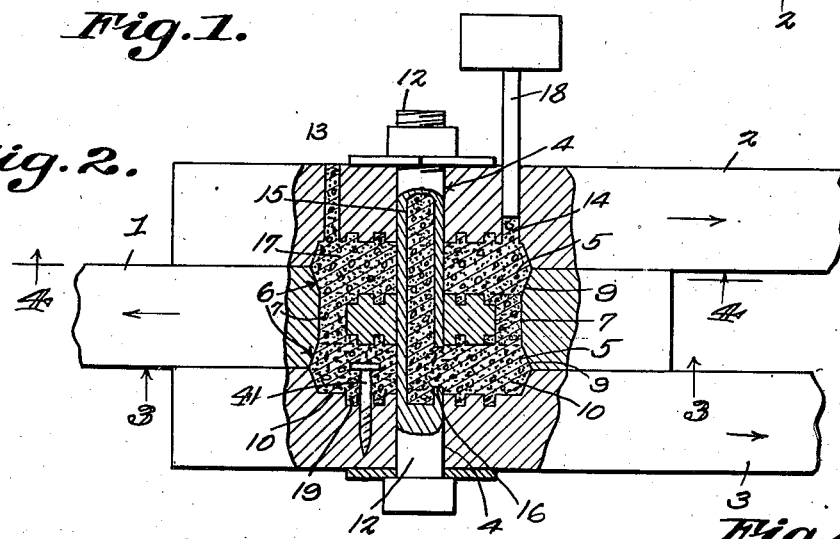
Figure 2 is a section on line 2—2, Figure 1.
Figures 3, 4:
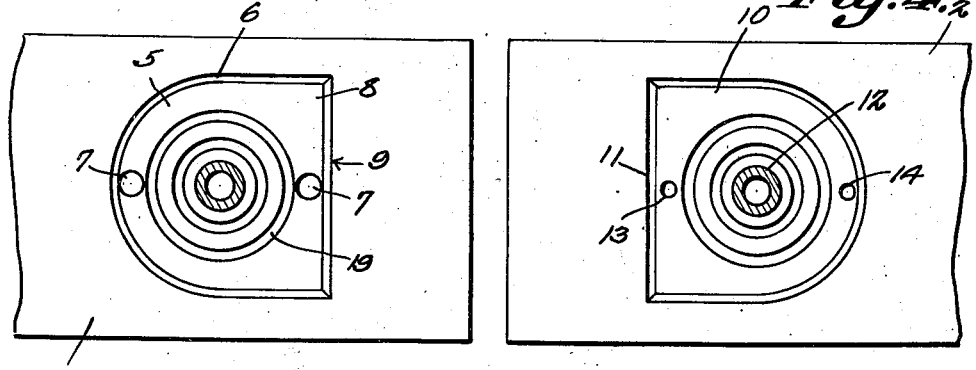
Figure 3 is a section on line 3—3, Figure 2.
Figure 4 is a section on line 4—4, Figure 2.

As has already been pointed out, the connector constituting this invention is useful in joining various types of timbers as well as wood and metal members such as employed in building constructions and other structures. A great variety of applications might be illustrated and described but it has been deemed desirable to show in the drawing only a few of them. For example, and as disclosed in Figures 1 to 4 inclusive, three timbers can be held properly assembled by the means therein disclosed. In this form of the invention which can be a roof truss or other structure wherein one or more timbers transmit thrust to other timbers, there is shown an intermediate timber 1 opposed faces of which are engaged by side timbers 2 and 3. A bore 4 is extended through all of the timbers and is proportioned to receive a clamping bolt as hereinafter explained. A recess or sinkage 5 is formed in each side of timber 1 and these are produced preferably by the use of a bit so that a circular recess is formed which is concentric with bore 4. Each recess or sinkage preferably is flared outwardly to a slight extent, the inclined walls being indicated at 6, and a desired number of flow holes 7 serve to connect the recesses 5. After the recesses or sinkages have been formed, each of them may be provided with a straight wall by removing portions of the timber with a chisel or the like to produce angles or corner portions as shown at 8. The resultant straight wall is indicated at 9 and these walls 9 of the two recesses or sinkages are located directly opposite to each other.

The timbers 2 and 3 are substantial duplicates and each is formed in one face with a recess or sinkage 10 formed about the bore 4 and preferably, though not necessarily, shaped like the sinkages 5. These recesses or sinkages 10, however are arranged with their straight walls opposite to the walls 9. In other words the walls 11 of recesses 10 and walls 9 of recesses 5 are located where they will receive the thrust resulting from pressures transmitted through the beams in different directions respectively, as shown, for example, by the arrows in Figure 2. One or more tell-tale openings 13 and 14 are drilled into one timber 2, so as to open into its sinkage 10.

After the timbers or beams have been fabricated as described they are ready for assembly. The timber 1 is positioned between the timbers 2 and 3 so that the recesses 5 open into the recesses 10. A bolt 12 is then inserted into the bore 4 and the timbers are brought to a predetermined angle relative to each other and the bolt is tightened. This bolt can be tubular for the greater portion of its length and has an inlet 15 at one end while an outlet 16 is provided in the bolt at a point between the timbers 1 and 3, opening into space 10.

The next step in the formation of the connector requires the introduction of a plastic material 17 into the bolt and from this it flows into and fills the spaces between the timbers provided by the recesses or sinkages 5 and 10. The material will move through the flow holes 7 until all of the spaces are filled and by observing the telltale holes 13 and 14 it can be determined when the filling operation has been completed. A weighted plunger can be mounted therein for free movement. This plunger 18 can serve as a signal device to indicate when the filling operation is complete and it can even be used for controlling the flow of plastic in any manner that might be obvious.

The plastic used as a filler can be of any suitable strong, hard drying material. Among other plastics used a strong cement of proper strength has been used successfully in a stiff state, this Portland cement having mixed with it suitable ingredients to insure strength and hardness when under stress.

After the plastic has hardened the assembly is complete and it will be found that the connector thus formed will be free from all of the disadvantages heretofore present where other forms of connectors are used.

All faces of the recesses or sinkages can be inclined, as shown, or they can be otherwise shaped to give the most advantageous connection for a particular purpose. The shape of the key or connector formed by the plastic is only limited by the tools and facilities for readily cutting into the members to be connected. The keys or connectors of plastic will always fit perfectly and can be made to actually bond with the timbers at the contact surfaces. This can be effected, for example, by forming grooves 19 in any desired shapes in selected surfaces and into which the plastic will flow. Any slight misalinement of the spaces in the timbers which is inevitable when time-wasting, exacting care in fabrication is not indulged in, will have no effect on the strength of the connection. Misalinement resulting from lumber shrinkage or swelling in the time interval between cutting and assembly will likewise cause no difficulty whatsoever in the assembly of the various members or the strength of the connections. Deleterious indeterminate stresses in the immediate zone of the connection, heretofore caused by driving into place ill-fitting metal connectors, are positively eliminated by this invention.

In this structure the clamping bolt serves to restrain the connector from overturning because of its clamping action on all of the members. The connector is also restrained from overturning because it embeds a portion of the bolt and grips it.

Suitably devised reinforcing means can be provided in the connectors by embedding metal in the plastic as will be obvious. For the purpose of restraining the connectors against overturning they can be anchored to one or more of the connected members. For example screws 41 can be driven into the members at points where they will project into the key holding space. Then when the plastic is forced into and fills the space it will become anchored by the screw or screws embedded therein, as will be apparent by referring to Figure 2.

Obviously should it be desired to so assemble the parts as to permit dismantling, it would merely be necessary to jacket the bolts and line the recesses with sheet material to prevent the plastic from adhering to the bolts and members. This is an obvious expedient.

By providing recesses which are not round but, instead, have substantially straight thrust receiving walls, there is no danger of the timbers being split by the key or connector when subjected to excessive pressures. Thus one of the main objections to the use of circular dowels or connectors is eliminated.

While the present improvements have been useful in the construction of parts of buildings, such as roof framing, etc., they also can be employed in the construction of bridges and wherever skeleton framing is essential, or the joining of several timbers to make a desired compound shape.

What is claimed is:

1. The method of connecting structural elements which includes the steps of prefabricating one of the elements to provide recesses in opposed faces thereof communicating through a connecting opening and to provide a telltale opening in a second element, drawing together said elements to substantially seal the recesses to form a cavity opening through the tell-tale opening and a second cavity opening solely through said connecting opening, and thereafter forcing a plastic, capable of hardening, into said second cavity at a point remote from the telltale opening to first fill said cavity and then cause the plastic to overflow from said cavity through the connecting opening into the other cavity to fill the same and finally to overflow into the telltale opening to indicate that the cavities are filled, said second cavity being closed against the outflow of plastic except through the connecting opening.

2. The method of connecting structural elements which includes the steps of prefabricating one of the elements to provide recesses in opposed faces thereof communicating through a connecting opening, and to provide a telltale opening extending through one of the elements, drawing together said elements by means of a bolt having a recess extending into one end thereof and closed at its other end, thereby to form one cavity opening through the tell-tale opening and a second cavity having an outlet solely at the connecting opening said bolt being extended through the cavities and opening into said second cavity at a point remote from the telltale opening, and thereafter forcing a plastic material, capable of hardening, into one end of the recessed bolt for extrusion into said second cavity to first fill said cavity and then cause the plastic to overflow from said cavity through the connecting opening into the other cavity to fill the same and finally to overflow into the telltale opening to indicate that the cavities are filled, and that a series of spaced connectors have been formed by the plastic, each extending into two elements.

3. The method of connecting structural timbers which includes the steps of prefabricating one of the timbers to provide recesses in opposed faces thereof communicating through a connecting opening and prefabricating other timbers to provide recesses in one face of each of them and to form a telltale opening communicating with one of said recesses positioning the timbers with the recesses in communication to provide cavities at opposite sides of one of the timbers, drawing all of the timbers together to substantially seal the cavities, and finally forcing a plastic, capable of hardening, into one of the cavities at a point remote from the telltale opening to first fill said cavity and then cause the plastic to overflow from said recess through the connecting opening into the other cavity to fill the same and finally to overflow into the telltale opening to indicate that all of the cavities have been filled to provide connectors each extending into two timbers.

4. The method of connecting structural timbers which includes the steps of prefabricating one of the timbers to provide recesses in opposed faces thereof communicating through a connecting opening and prefabricating other timbers to provide recesses in one face of each of them and to form a telltale opening communicating with one of said recesses, positioning the timbers with the recesses in communication to provide cavities at opposite sides of one of the timbers, drawing the timbers together by means of a bolt having a recess extending into one end and positioned to open into one of the cavities at a point remote from the telltale opening, the other end of the bolt being closed, and finally forcing a plastic, capable of hardening, into the recessed end of the bolt for extrusion therefrom into one of the cavities at a point remote from the telltale opening to first fill said cavity and then cause the plastic to overflow from said cavity through the connecting opening into the other cavity to fill the same and finally to overflow into the telltale opening to indicate that the cavities are filled to form connectors each of which is extended into two timbers.

5. The method of connecting structural timbers which includes the steps of prefabricating one of the timbers to provide recesses in opposed faces thereof communicating through a connecting opening and prefabricating other timbers to provide recesses in one face of each of them and to form a telltale opening communicating with one of said recesses, positioning an anchoring element in one of the recesses, positioning the timbers with the recesses in communication to provide cavities at opposite sides of one of the timbers, drawing all of the timbers together to substantially seal the cavities, and finally forcing a plastic, capable of hardening, into one of the cavities at a point remote from the telltale opening to first fill said cavity and then cause the plastic to overflow from said recess through the connecting opening into the other cavity to fill the same and finally to overflow into the telltale opening to indicate that all of the cavities have been filled, said plastic constituting means for enveloping the anchoring element.

MAX MILLER.